UNITED STATES PATENT OFFICE.

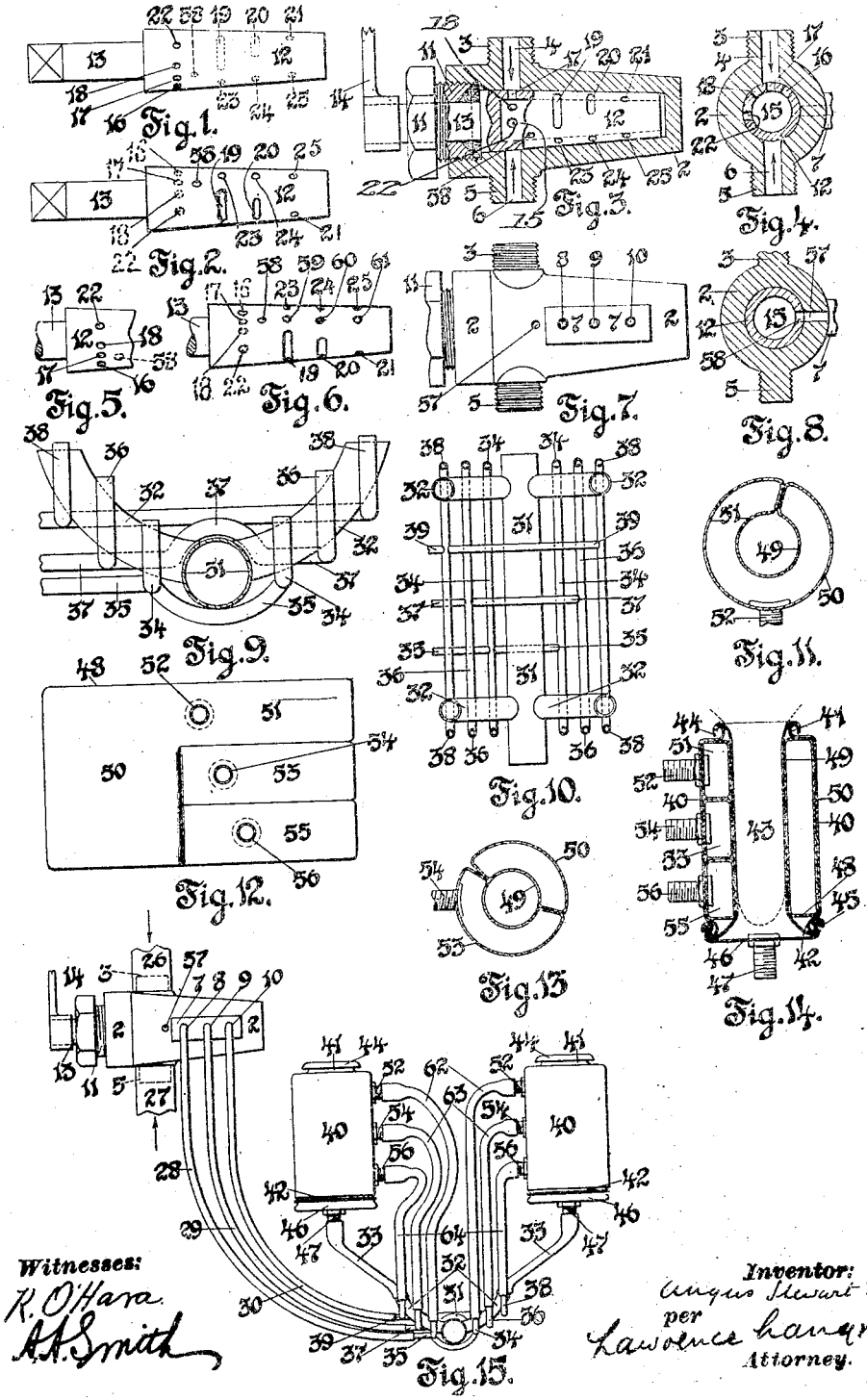

ANGUS STEWART REID, OF ST. KILDA, MELBOURNE, VICTORIA, AUSTRALIA.

MILKING APPARATUS.

1,044,246.   Specification of Letters Patent.   Patented Nov. 12, 1912.

Application filed September 23, 1911. Serial No. 650,984.

*To all whom it may concern:*

Be it known that I, ANGUS STEWART REID, a subject of the King of Great Britain and Ireland, and a resident of Queen's Mansions, Beaconsfield Parade, in the city of St. Kilda, a suburb of the city of Melbourne, in the county of Bourke, State of Victoria, Commonwealth of Australia, have invented certain new and useful Improvements in or Relating to Milking Apparatus, of which the following is a specification.

This invention relates to milking apparatus of the kind using compressed air and vacuum, numerous devices being hitherto suggested, in which efforts have been directed toward the imitation of the movement of the human hand when milking animals. The teat cups however, have not generally followed the actions of the hand nor have the pulsating appliances and arrangements of piping permitted such an application of vacuum and air as to cause a correct imitation. In addition it has been usual to maintain a constant vacuum within the teat cups to retain them to the animal and assist the milk flow, notwithstanding that this is known to be injurious.

The object of this invention is to provide an alternating pressure to an animal's teats, with the aid of compressed air and vacuum, an imitation of the fingers and palm of the human hand. The apparatus used is simple, effective, cheap and underangeable, the constant vacuum so often used within the teat cups also being dispensed with, the milk being conveyed to the milk bucket by gravity. But in order that this invention may be better understood reference will now be made to the accompanying sheet of drawings which is to be taken as part of this specification and read herewith and in which the apparatus illustrated by the several views is adapted to milk two animals:—

Figure 1 is a view of a plug of a pulsator showing chamber air inlet ports and a main chamber vacuum port. In broken lines are seen chamber air outlet ports and chamber vacuum ports. Fig. 2 is a view illustrating the opposite side of the plug to that shown in Fig. 1. A main chamber atmospheric air port is also seen. In broken lines are seen the chamber air inlet ports and the main chamber vacuum port. Fig. 3 is a view partly in section showing the plug within a shell and a chamber within the plug. An air inlet port and a vacuum port in the shell are clearly seen. Fig. 4 is a cross section showing the plug within the shell. The chamber air inlet ports and the main chamber vacuum port of the plug, and the air inlet port and the vacuum port in the shell are clearly seen. Fig. 5 is a view of portion of a modified plug showing the chamber air inlet ports and main chamber vacuum port slightly altered in their disposition to each other. Fig. 6 is a view illustrating the opposite side of the modified plug to the view of Fig. 5, and showing the chamber air outlet ports, the chamber vacuum ports and the main chamber atmospheric air port which have been slightly altered in their disposition to each other to provide for the introduction of a series of chamber atmospheric air ports. Fig. 7 is an outside view of the pulsator portion being broken away for convenience of illustration. An atmospheric air port in the shell is clearly seen. Fig. 8 is a cross section showing the plug within the shell. The main chamber atmospheric air port and the shell atmospheric air port are seen in communication. Fig. 9 is an enlarged end view of an air and vacuum distributer. Fig. 10 is a plan on a reduced scale of the air and vacuum distributer. Fig. 11 is an enlarged sectional plant of a palm and a first finger of a flexible bag of a teat cup. Fig. 12 is a view of flexible bags of a teat cup in a flat state. Fig. 13 is a sectional plan of a palm and a second finger of the flexible bag of a teat cup. Fig. 14 is a sectional view of a teat cup. Fig. 15 is a diagrammatic view of a pulsator, distributer and teat cups assembled.

This invention includes a pulsator having (Figs. 3, 4, 7, 8 and 15) a shell 2 provided with a threaded air branch 3 having an air inlet port 4 therein. The shell is also provided with a threaded vacuum branch 5 having a vacuum port 6 therein. Projecting from the shell between the branches 3 and 5 is a protuberance 7 in which is a first air and vacuum port 8, a second air and vacuum port 9, and a third air and vacuum port 10. Formed in the shell is also a shell atmospheric air port 57. Threaded into the shell 2 is a suitable gland 11.

Within the shell 2 (Figs. 1, 2, 3, 4, 5, 6, 7, 8 and 15) is a hollow conical plug 12 having a neck 13 to which is secured an oscillating lever 14. This latter may be operated in any well-known way. Within the conical plug is a chamber 15. Leading into the chamber 15 is a first chamber air inlet port 16. Adjacent the first port 16 is a second chamber air inlet port 17. Adjoining the second port 17 is a third chamber air inlet port 18. Leading from the chamber 15 is a first chamber elongated air outlet port 19. Adjacent the first port 19 is a second chamber elongated air outlet port 20. Adjoining the second port 20 is a third chamber air outlet port 21. It will be observed that the ports 16, 17 and 18, are in a vertical line, whereas the ports 19, 20 and 21 are arranged in a diagonal line as regards one end and are in a horizontal line as regards the other. Leading to the chamber 15 is also a main chamber vacuum port 22. In the plug and adjoining the ports 19, 20 and 21, are formed three chamber vacuum ports marked 23, 24 and 25 and hereinafter referred to as first, second and third chamber vacuum ports respectively. Formed in the plug 12 and communicating with the chamber 15 therein and disposed between the chamber air outlet ports 19, 20, 21 and the chamber vacuum ports 23, 24, 25, is a main chamber atmospheric air port 58. This may be used with the ports already described in the plug and the shell alone, when it serves to reduce compressed air to atmospheric pressure in the chamber 15 only as will be hereinafter understood, or, it may be used in conjunction with a series of additional ports to reduce compressed air to atmospheric pressure in the teat cups as well. The additional ports (Fig. 6) consist of a first chamber atmospheric air port 59 adjacent which is a second chamber atmospheric air port 60, adjoining the second port 60 is a third chamber atmospheric air port 61.

Attached to the threaded air branch 2 (Fig. 15) is an air pipe line 26. Attached to the threaded vacuum branch 5 is a vacuum pipe line 27. These may communicate respectively with a vacuum forming pumps and an air compressor of any known character. Leading from the first air and vacuum port 8 is a first air and vacuum flexible pipe 28. Leading from the second air and vacuum port 9 is a second air and vacuum flexible pipe 29. Leading from the third air and vacuum port 10 is a third air and vacuum flexible pipe 30. These communicate with a distributer hereinafter described.

With the foregoing (Figs. 9, 10 and 15) is used a compressed air distributer consisting of a major milk pipe 31 with which communicates curved minor milk pipes 32. Attached to each of the minor milk pipes 32 is a flexible milk pipe 33. This communicates with a milk nipple of a teat cup hereinafter described. Supported by and extending between the minor milk pipes 32 is a first pair of air and vacuum pipes 34, communicating with each other by a first air and vacuum cross pipe 35. With this pipe 35 communicates the first air and vacuum flexible pipe 28. Supported by and extending between the minor milk pipes 32 is a second pair of air and vacuum pipes 36, communicating with each other by a second air and vacuum cross pipe 37. Communicating with the second air and vacuum cross pipe 37 is the second air and vacuum flexible pipe 29. Supported by and extending between the minor milk pipes 32 is a third pair of air and vacuum pipes 38, communicating with each other by a third air and vacuum cross pipe 39. The third air and vacuum cross pipe 39 is in communication with the third air and vacuum flexible pipe 30.

With the foregoing (Figs. 14 and 15) are used teat cups. Each of these consists of a metallic or other inflexible outer casing 40 having a beaded upper neck 41 and a beaded lower neck 42. Formed in the casing 40 between the upper neck 41 and the lower neck 42 are three nipple holes hereinafter referred to.

Within the casing 40 (Fig. 14) is a flexible inner lining 43. This has an over-turned upper portion 44 enveloping the upper neck 41. It also has an over-turned lower portion 45 enveloping the lower neck 42. Over the lower neck 42 is sprung a spring bottom 46 carrying a suitable milk nipple 47. Or the lining 43 may be otherwise secured and the bottom 46 threaded to the casing 40. With each milk nipple 47 communicates a flexible milk pipe 33 aforementioned.

Within the outer casing 40 and between the same and a flexible lining 43 is situated a flexible bag or bags. This (Figs. 11, 12, 13 and 14) consists of an enlarged portion or flexible palm 48, having an inner side 49 and an outer side 50. The area of the palm may vary as also may its thickness and its flexibility. Integral with the palm 48 and protruding from the top of the same is a first hollow flexible finger 51. Projecting from the first finger 51 or the palm 48 is a first nipple 52. Below the first finger 51 is a second and independent hollow flexible finger 53. Projecting from the second finger 53 is a second nipple 54. The second finger may be separate from or hinged to the palm 48, as shown in Fig. 13. Below the second finger 53 is a third and independent hollow flexible finger 55. Projecting from the third finger 55 is a third nipple 56. The third finger may be separate from or hinged to the palm 48. Each of the nipples 52, 54 and 56 are accommodated by the nipple holes aforementioned in the casing 40 and communicate with the air and vacuum pipes 34, 36 and 38 respectively, by means (Fig. 15) of air and vacuum flexible pipes 62, 63 and 64. The number of fingers used is, of course, not limited to the number shown and described for illustrative purposes.

With this invention constant vacuum is maintained in any well known way upon the vacuum port 6 and compressed air in any well known way is maintained continually within the air inlet port 4. The hollow conical plug 12 is also caused to oscillate in any well known way with the result that when the main chamber vacuum port 22 is in alinement with the vacuum port 6 a vacuum is formed in the chamber 15. At the same time the chamber vacuum ports 23, 24 and 25 are in alinement with the air and vacuum ports 8, 9 and 10 which communicate with the nipples, 52, 54 and 56. Vacuum thus obtains in the palm 48, first finger 51, second finger 53, and third finger 55 simultaneously and there is no pressure upon the teat. As the plug 12 continues to oscillate or returns in its movement the ports aforementioned are disalined and closed to each other. The first chamber air inlet port 16 comes into communication with the air inlet port 4, compressed air then obtaining within the chamber 15. At the same time the chamber air outlet port 19 is in communication with the first air and vacuum port 8. Compressed air then obtains within the palm 48 and first finger 51, inflating the same and compressing the teat near its root. The plug continuing to move, the second chamber air inlet port 17 in turn alines itself with the air inlet port 4. At the same time the second chamber air outlet port 20 is in alinement with the second air and vacuum port 9. Compressed air then obtains in and inflates the second independent finger 53. By the elongation of the first chamber air outlet port 19, however, the palm 48 and first finger 51 still continue to receive compressed air. The plug continuing to move the third chamber air inlet port 18 in turn comes into alinement with the air inlet port 4. At the same time the third chamber air outlet port 21 is in communication with the third air and vacuum port 10. Compressed air is then communicated to the third finger 55 inflating same. By the elongation of the second chamber air outlet port 20, however, the second finger 53 still continues to receive compressed air. All flexible bags are now inflated, the teat being compressed between the fingers and the palm. The movement of the plug continuing, it is now returning, all the ports eventually become disalined with the exception of the shell atmospheric air port 57 and the main chamber atmospheric air port 58, which, if used alone, permit the compressed air then locked within the chamber 15 to escape into the atmosphere. Should the atmospheric air ports 59, 60 and 61 be also used these come into alinement with the air and vacuum ports 8, 9 and 10 when the ports 57 and 58 are in alinement. The compressed air then confined within the palm 48 and fingers 51, 53 and 55 then escapes into the atmosphere. The plug continuing to move the atmospheric air ports are disalined and the vacuum ports once more alined with the result already described.

Having now described my invention, what I claim as new and desire to secure by Letters Patent is:—

1. Milking apparatus having a pulsator comprising a shell, a compressed air inlet port in said shell, a vacuum inlet port in said shell, a plurality of combined air and vacuum ports in said shell adapted to lead to a teat cup divided into a plurality of compartments, a hollow valve plug within said shell, ports in said plug adapted to place said combined air and vacuum ports successively in communication with the compressed air inlet port, and ports in said plug adapted to place said combined air and vacuum ports simultaneously in communication with the vacuum inlet port.

2. Milking apparatus having a pulsator comprising a shell, a compressed air inlet port in said shell, a vacuum inlet port in said shell, a plurality of combined air and vacuum ports in said shell adapted to lead to a teat cup divided into a plurality of compartments, an atmospheric air port in said shell, a hollow valve plug within said shell, ports in said plug adapted to place said combined air and vacuum ports successively in communication with the compressed air inlet port, a port in said plug adapted to place the interior of said plug in communication with the aforesaid atmospheric air port, and ports in said plug adapted to place said combined air and vacuum ports simultaneously in communication with the vacuum inlet port.

3. Milking apparatus having a pulsator comprising a shell, a compressed air inlet port in said shell, a vacuum inlet port in said shell, a plurality of combined air and vacuum ports in said shell adapted to lead to a teat cup divided into a plurality of compartments, an atmospheric air port in said shell, a hollow valve plug within said shell, ports in said plug adapted to place said combined air and vacuum ports successively in communication with the compressed air inlet port, ports in said plug adapted to place said combined air and vacuum ports in communication with the aforesaid atmospheric air port, and ports in said plug adapted to place said combined air and vacuum ports simultaneously in communication with the vacuum inlet port.

4. In improvements in or relating to milking apparatus, a distributer consisting of a major milk pipe and minor milk pipes communicating therewith, a first pair of air and vacuum pipes supported by said minor milk pipes, a first air and vacuum cross pipe communicating with each pipe of said pair, a second pair of air and vacuum pipes supported by said minor milk pipes, a second air and vacuum cross pipe communicating with each pipe of said pair, a third pair of air and vacuum pipes supported by said minor milk pipes and a third air and vacuum cross pipe communicating with each pipe of said pair.

5. In improvements in or relating to milking apparatus, a teat cup having an inflexible outer casing, and a flexible inflatable palm member and flexible inflatable finger members.

6. In improvements in or relating to milking apparatus, a teat cup having an outer casing, a flexible bag within said casing, said bag consisting of a palm having a first hollow finger communicating therewith, a first nipple communicating with said palm and finger, independent hollow fingers below said first finger, and a nipple communicating with each independent finger.

7. In improvements in or relating to milking apparatus, a teat cup having an outer casing, a flexible bag within said casing, said bag consisting of a palm having a first hollow finger communicating therewith, a first nipple communicating with said palm and finger, independent hollow fingers below said first finger and hinged to said palm, and a nipple communicating with each independent finger.

8. In improvements in or relating to milking apparatus, a teat cup having an inflexible outer casing, a flexible inflatable palm member, flexible inflatable finger members, and an inner lining within said members.

9. In improvements in or relating to milking apparatus, a teat cup having an outer casing, a flexible bag within said casing, said bag consisting of a palm having a first hollow finger communicating therewith, a first nipple communicating with said palm and finger, independent hollow fingers below said first finger, a nipple communicating with each independent finger and an inner lining to said teat cup.

10. In improvements in or relating to milking apparatus, a teat cup having an outer casing, a flexible bag within said casing, said bag consisting of a palm having a first hollow finger communicating therewith, a first nipple communicating with said palm and finger, independent hollow fingers below said first finger and hinged to said palm, a nipple communicating with each independent finger and an inner lining to said teat cup.

11. In improvements in or relating to milking apparatus, a teat cup having an inflexible outer casing, a flexible inflatable palm member, flexible inflatable finger members, and an inner flexible lining within said members and embracing at its top and bottom the outer casing.

12. In improvements in or relating to milking apparatus, a teat cup comprising an inflexible outer casing having an upper neck and a lower neck, a flexible bag within said casing, said bag consisting of a palm having a first hollow finger communicating therewith, a first nipple communicating with said palm and finger, independent hollow fingers below said first finger, a nipple communicating with each independent finger, an inner lining to said teat cup and embracing the upper and lower necks of the casing, a bottom on said casing and a milk nipple carried by said bottom.

In witness whereof I affix my signature in presence of two witnesses.

ANGUS STEWART REID.

Witnesses:
EDWIN PHILLIPS,
GEORGE A. U'REN.